2 Sheets--Sheet 1.
G. G. WOLFE.
Reservoir Cooking-Stoves.
No. 5,442. Reissued June 10, 1873.
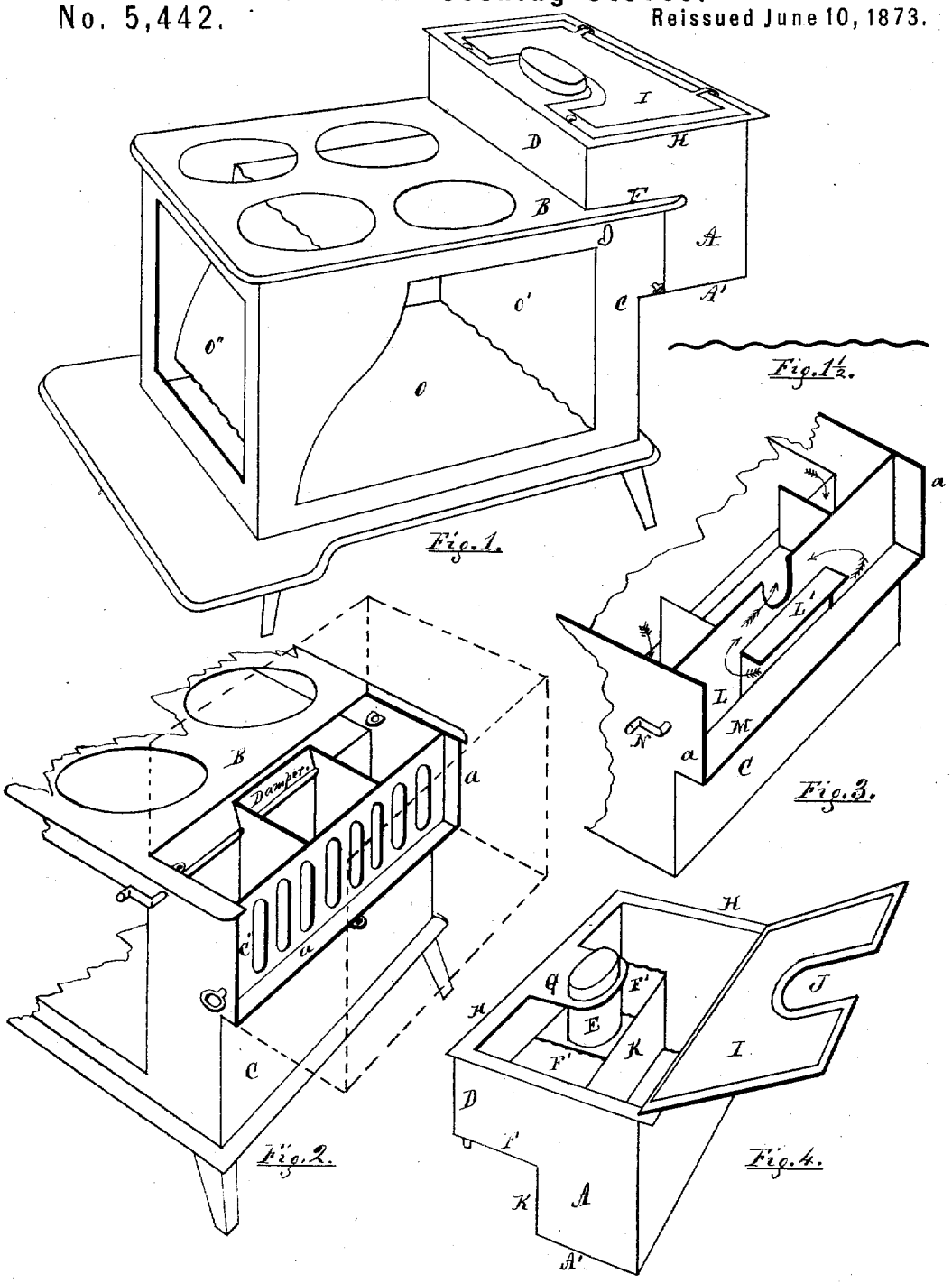
Witnesses.
H. A. Daniels
Geo. N. Howard.
Inventor.
Gurdon G. Wolfe
AM. PHOTO-LITHOGRAPHIC CO. N.Y. (OSBORNE'S PROCESS.)

2 Sheets--Sheet 2.
G. G. WOLFE.
Reservoir Cooking-Stoves.
No. 5,442. Reissued June 10, 1873.
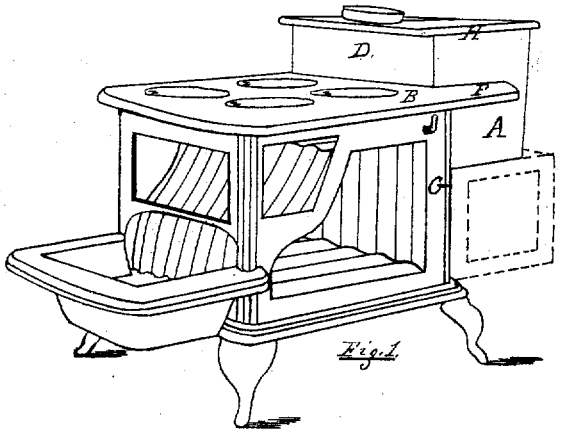
Fig. 1.
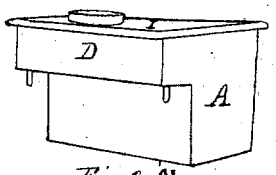
Fig. 2. A'
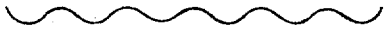
Fig. 3.
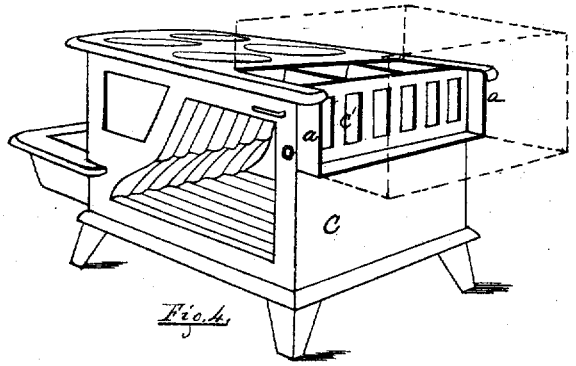
Fig. 4.
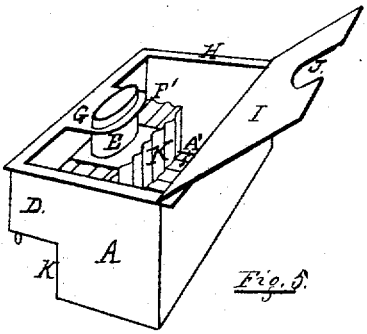
Fig. 5.
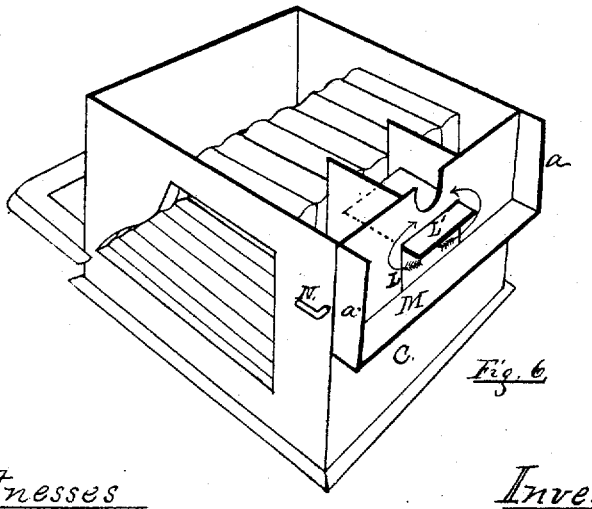
Fig. 6.
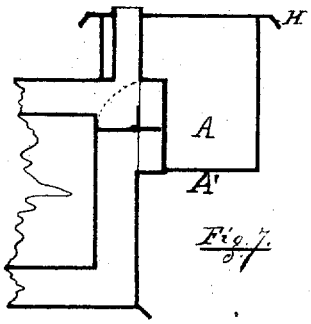
Fig. 7.
Witnesses
C. D. Killum
E. L. Freeman
Inventor
Gurdon G. Wolfe
AM. PHOTO-LITHOGRAPHIC CO. N.Y. (OSBORNE'S PROCESS.)

UNITED STATES PATENT OFFICE.

GURDON G. WOLFE, OF TROY, NEW YORK.

IMPROVEMENT IN RESERVOIR COOKING-STOVES.

Specification forming part of Letters Patent No. 76,292, dated March 31, 1868; reissue No. 5,442, dated June 10, 1873; application filed July 24, 1871.

*To all whom it may concern:*

Be it known that I, GURDON G. WOLFE, of the city of Troy, in the county of Rensselaer and State of New York, have heretofore invented certain new and useful Improvements in Cooking-Stoves and Reservoirs for the same, upon which Letters Patent of the United States were granted to me, bearing date March 31, 1868; and I do hereby declare that the following is a full, clear, and exact description of the nature, construction, and operation of the same, reference being hereby had to the accompanying drawings, which make a part of this my new, corrected, and amended specification; and I do now surrender the said Letters Patent in order that the invention and improvements aforesaid may be herein more fully described and set forth, and by such amended and corrected specification and claims my rights therein shall be more fully and permanently protected, as by law provided.

In the drawings and specification like letters represent and refer to like or corresponding parts.

Figure 1 represents in perspective a view of a cooking-stove containing my improvements in the construction of the plates of the oven of cooking-stoves, also my improved reservoir or water-tank combined therewith, and each more fully described hereinafter. Fig. 1½ represents a cross-section of one of the corrugated plates forming the bottom of the reservoir, the oven-plates of the stove being of the same pattern. Fig. 2 represents a cooking-stove showing the manner in which my said reservoir or water-tank is arranged and combined therewith. Fig. 3 shows another construction of the rear portion of a cooking-stove to which my improved reservoir may be attached, in the manner more fully hereinafter described. Fig. 4 is a perspective view of my said improved reservoir or water-tank with the lid or cover thereof open, and clearly showing the construction thereof more fully hereinafter described.

The nature of my said invention and improvements consists in the manner of constructing and forming a water-reservoir, and in the manner of attaching and applying the same to cooking-stoves, substantially as hereinafter described and specified. It also consists in so constructing, arranging, and combining with a cooking-stove a reservoir or water-tank that a part thereof shall fit into and form a part of the top plate of such stove, and at same time rest and remain over and upon the flue or flues in the rear end of such stove, as well as over the flue passing from the fire-chamber over the oven to the exit-flue in the rear end of said stove, while at same time a part or portion thereof shall extend downward from the top plate aforesaid and against the rear-end vertical plate of such stove, or against a damper therein, in case it should be deemed best to make such damper-openings in such vertical end plate, thereby heating the bottom and side, in part, of such reservoir, in the manner substantially as herein described and set forth. It also consists in the arrangement of a damper in the rear and vertical end plate of a cooking-stove, and the combination of the same with the reservoir of a cooking-stove in the manner and for the purposes substantially as herein described. It also consists in constructing a reservoir or water-tank for a cooking-stove with a part or portion of the bottom thereof raised up or elevated within the said reservoir, with the exit-pipe arranged in such part or portion, as shown at Fig. 4 of accompanying drawings, and substantially as and for the purposes herein described and set forth. It also consists in the removing of a part or portion of the rear end of the top plate of a cooking-stove, so as to form an opening of sufficient capacity to receive and contain a part of the bottom of a reservoir or water-tank, substantially as shown at Fig. 2 of accompanying drawings, and herein described and set forth. It also consists in the employment of a hot-air chamber, of the size of that part of such reservoir hanging below the top plate of such stove which shall communicate with the flue or flues in the rear end of said stove, by means of a flue-opening and flue-plate, in the manner substantially as shown at Fig. 3 of accompanying drawings, and in the manner and for the purposes substantially as hereinafter described and specified.

Having thus described the nature of my said invention and improvements, I will now proceed to describe the construction and operation of the same, which are as follows, to wit: I construct my said reservoir or water-tank of tin, lined with copper or other suitable material, and in size to correspond with the cooking-stove where the same is to be used. The back part or portion of such reservoir projects and continues downward below the bottom of the front part thereof, in the manner substantially as shown at Figs. 1 and 4 of accompanying drawings. The said reservoir or water-tank may be seen in perspective at Fig. 4. A is that part of said reservoir which projects downward from and below the top plate B of the stove, and against the rear vertical end plate C, or against flanges cast on said end plate containing the damper C′. D is that part of such reservoir which is fitted into the top plate B at the rear end thereof. A sufficient portion of said top plate B is removed so as to receive and contain such reservoir, as shown at Fig. 2, thereby permitting the upper portion of such reservoir to cover the flue or flues in the rear end of the cooking-stove, as well as to cover some part or portion of the flue over the top of the oven, if found expedient so to do, and at same time filling up the said opening in said top plate so as to expose that part or portion of said reservoir which is raised up and above the bottom part A, and marked F, Figs. 1 and 4. The bottom itself of this part of my said reservoir may be seen at F′, Fig. 4, and it may be corrugated as shown in said figure, for the purpose of increasing the heating-surface of said bottom part of said boiler, or it may be constructed with an entirely smooth surface. In this elevated part of said bottom of the reservoir I arrange and construct the exit-pipe E, as shown at Fig. 4, said exit-pipe being placed over the exit-flue of the stove. From the upper bottom F′ to the lower bottom A′ is constructed a plate, K, cast with said reservoir. This plate K is that part or portion of my said reservoir which comes against or in contact with the damper or damper-opening C′, shown at Fig. 2, and which part is constructed to fit the end plate C, or any flanges cast therein, as seen at *a*′, Figs. 2 and 3.

My said reservoir is constructed in form, shape, and with the respective plates or parts substantially as shown at Fig. 4, and when it is applied to, arranged, and combined with a cooking-stove it will be substantially as shown at Fig. 1.

The flues at the top in the rear end of the said stove are exposed, and a part of the top plate B corresponding to that part of said reservoir to be fitted thereto is removed and the damper and damper-openings C′ in the vertical and rear-end plate C of such stove are each and all constructed, arranged, and combined substantially as shown at Fig. 2.

Another form of arranging the flues for heating said reservoir upon and with a cooking-stove, as aforesaid, will appear upon an inspection of the accompanying drawings, at Fig. 3 thereof. Instead of using the damper C′, I use an elongated flue, L, with a flue-plate or strip, L′, immediately over such flue-opening. This opening L permits the hot air to pass from the rear end of said stove into a chamber, M, outside of the rear end of the stove, one side of which is formed or completed by means of that part of said reservoir which comes against the flanges or jambs *a*, when said reservoir is applied to said stove, as aforesaid, while the bottom part F′ covers the upper part of said chamber M, when fitted and applied to and with the top plate B, as aforesaid. To control the passage of the heat into said chamber M, I use the damper N, same figure.

When my said reservoir is applied to a stove, as shown at Fig. 1, the damper C′ may be open or closed. If it should be necessary for the rapid heating of water in my said reservoir to bring more heat to bear upon such reservoir, then such damper may be open; but for the usual and ordinary purposes of heating water it will not be necessary that said damper C′ should be open; for the action of the heat against that part of said reservoir over the flue, as aforesaid, together with the heat from the exit-pipe E, will be sufficient for all practical purposes without the use of said damper; and yet if more heat should be desired against said reservoir for rapid heating of water in said reservoir, then said damper may be opened, otherwise it will remain closed.

I prefer to construct my said reservoir wholly of cast-iron; but it is manifest that, as I have hereinbefore stated, it may be constructed of tin, copper, or other sheet metal, casting only the rim H and the cover I.

By constructing a reservoir substantially as aforesaid, I am enabled to get more surface for heating water therein, at same time making a reservoir of more strength and utility than any heretofore made, and also greatly economize room for the use of such stove, for it will at once appear, on examination of said drawing, that at least one-half of the thickness of the reservoir is saved. I also greatly economize the use of fuel, as more surface is exposed to the action of the heat upon said reservoir. It is also more convenient to pour water into such reservoir or to dip therefrom than it would be were the whole reservoir above the top plate of the said stove. Water in said reservoir may be heated very hot—more so than in any other reservoir, so far as I have any knowledge or information.

A warming-closet may be arranged underneath said bottom part A of said reservoir in the usual manner. The plate K may be corrugated in the same manner as the upper bottom plate F′, if deemed best so to construct the same, and thus give increased heating-surface.

Having thus described the nature, construction, and operation of my said invention and improvements, what I claim as my invention, and desire to secure by Letters Patent of the United States, is—

1. The reservoir or water-tank A constructed with an upper bottom, F′, and lower bottom A′, and intermediate plate K, substantially as described.

2. The reservoir A constructed with an upper bottom, F′, and lower bottom A′, and intermediate plate K, in combination with the flue E, substantially as herein described.

3. The combination of the reservoir or water-tank A, constructed substantially as herein described, with a cooking-stove having a part or portion of the rear end of the top thereof removed, substantially as shown at Fig. 2 of accompanying drawings, so as to receive and contain the upper part or bottom F′ of said reservoir, in the manner and for the purposes substantially as herein described and set forth.

4. The employment of the damper C′ in the upper part of the rear and vertical end plate of the cooking-stove, in combination with the vertical flues in the rear end of the stove and with that part or portion of said reservoir extending below the top plate of said cooking-stove, as seen at Fig. 1 of accompanying drawings, and in the manner and for the purposes substantially as herein described and set forth.

5. The employment and arrangement of a reservoir or water-tank with a cooking-stove, so that a part of such reservoir shall be above the top of the stove and over the vertical flue or flues in the rear end thereof, and a part below such top plate, in the manner substantially as shown at Fig. 1 of the accompanying drawings.

In testimony whereof I have hereunto set my hand this 12th day of July, A. D. 1871.

GURDON G. WOLFE.

Witnesses:

C. D. KELLUM,

JOHN W. ALGER.